United States Patent
Wang et al.

(10) Patent No.: US 7,533,077 B2
(45) Date of Patent: May 12, 2009

(54) METHOD, SYSTEM AND PROGRAM PRODUCT FOR AUTOMATICALLY CREATING MANAGED RESOURCES

(75) Inventors: Ping Wang, Austin, TX (US); Qinhua Wang, Austin, TX (US); Leigh A. Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/286,561

(22) Filed: Oct. 31, 2002

(65) Prior Publication Data
US 2004/0088304 A1    May 6, 2004

(51) Int. Cl.
*G06F 7/00* (2006.01)
(52) U.S. Cl. .............................. 707/1; 707/2; 707/100; 717/108; 717/116; 717/118
(58) Field of Classification Search .................. 707/1–3, 707/10, 100–104.1, 200, 205; 709/200–203, 709/217–219; 715/500, 513, 517; 717/100, 717/106, 108, 136, 140–144, 116, 118; 719/313, 719/315, 328
See application file for complete search history.

(56) References Cited

U.S. PATENT DOCUMENTS

| | | | | |
|---|---|---|---|---|
| 6,664,978 B1 * | 12/2003 | Kekic et al. | ................. | 709/203 |
| 6,754,773 B2 * | 6/2004 | Ulrich et al. | ................. | 711/118 |
| 6,782,350 B1 * | 8/2004 | Burnley et al. | .............. | 702/186 |
| 2002/0073091 A1 * | 6/2002 | Jain et al. | .................... | 707/100 |
| 2002/0147748 A1 * | 10/2002 | Huang et al. | | |

OTHER PUBLICATIONS

Nazmul Idris, "Java & XML Programming", copyright 1999, <http://developerlife.com>, pp. 1-54.*
W3C, "Extensible Markup Language (XML) 1.0", W3C Recomendation Feb. 10, 1998, <http://www.w3.org/TR/1998/REC-xml-19980210>, pp. 1-27.*
Timothy Budd, "Understanding Object Oriented Programming with Java", 2000, Addison Westley Longman, Inc., pp. 53-56.*

* cited by examiner

*Primary Examiner*—Hung Q Pham
(74) *Attorney, Agent, or Firm*—Mark Walker; Hoffman Warnick LLC

(57) ABSTRACT

Under the present invention a definition file and an object file are provided. The definition file includes a defined syntax for managed object descriptions, while the object file contains a description of a particular desired object. When a process is started (or re-started), the files are automatically read and the description in the object file is automatically validated based on the defined syntax in the definition file. Once validated, the description is used to automatically create a managed resource from which a managed object can be created.

18 Claims, 3 Drawing Sheets

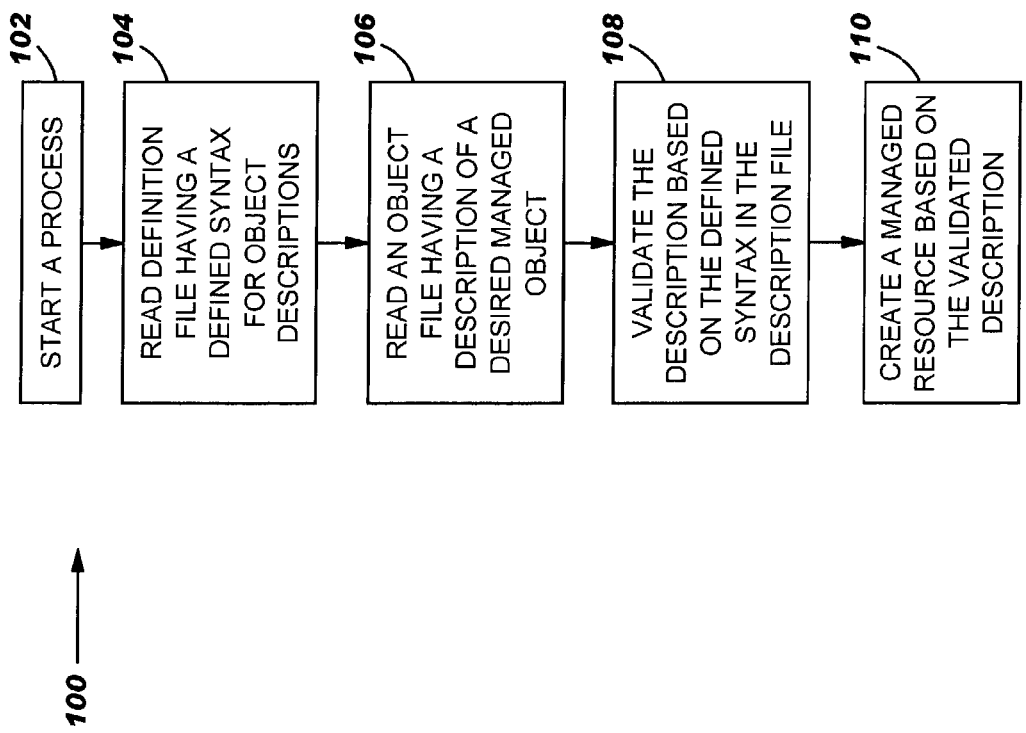

METHOD, SYSTEM AND PROGRAM PRODUCT FOR AUTOMATICALLY CREATING MANAGED RESOURCES

BACKGROUND OF THE INVENTION

1. Field of the Invention

The present invention generally relates to a method, system and program product for automatically creating managed resources. Specifically, the present invention allows a managed resource to be created at run-time based on a defined syntax for object descriptions and a description of the managed resource.

2. Background Art

As electronic commerce grows, businesses are increasingly implementing complex websites to foster growth and profitably. To develop and deploy integrated websites, developers often rely on software products such as WEBSPHERE, which is commercially available from International Business Machines Corp. of Armonk, N.Y. Products such as WEBSPHERE allow a developer to create and manage websites using JAVA-based resources such as classes and objects. As known in the art, a JAVA class is a template or blueprint from which JAVA objects are created. Moreover, an object is a specific instance of a particular class. In general, a JAVA object includes data (i.e., instance fields) that is operated on by procedures (i.e., methods). It is also typical for products such as WEBSPHERE to work in conjunction with management programs such as JAVA MANAGEMENT EXTENSIONS (JMX). Specifically, JMX is a package addition to Java 2 Platform, standard edition (J2SE) that provides management and monitoring services of JAVA resources.

Unfortunately, current creation of JAVA classes and objects requires that a development phase be followed. That is, for a class to be created, a developer must manually generate the class, compile it, test it, etc. Since this procedure is often slow and tedious, the creation of JAVA classes and objects is typically inefficient. Although JMX allows new managed resources to be registered, it does not allow resources that are not part of the core program to be available in a distributed environment. Moreover, JMX still requires each managed resource to be manually created. Thus, no existing system allows a desired managed resource to be automatically created based on a description of the desired managed resource.

In view of the foregoing, there exists a need for a method, system and program product for automatically creating managed resources. Specifically, a need exists for a definition file that sets forth a defined syntax for describing managed objects. A further need exists for an object file containing a description of a desired managed object. Still yet, a need exists for the description in the object file to set forth attributes of the desired managed object. Another need exists for the description to be validated based on the defined syntax in the definition file. If the description is valid, an additional need exists for a managed resource (e.g., a JAVA class) to be generated based on the description.

SUMMARY OF THE INVENTION

In general, the present invention provides a method, system and program product for automatically creating managed resources. Specifically, under the present invention, when a process such as a JAVA virtual machine is started, a definition file and an object file are automatically read. The definition file defines a syntax for object descriptions, and the object file contains a description of a desired managed object. Based on the object description syntax in the definition file, the description of the desired managed object is automatically validated. If the description is valid, a managed resource such as a JAVA class is automatically created based thereon. Once the JAVA class is created, managed objects based thereon can be created. Since the JAVA class was created based in the description set forth in the object file, the managed objects created based on the JAVA class will have the attributes set forth in the description. Thus, the present invention allows a managed resource to be created simply by providing a description of the desired resource.

According to a first aspect of the present invention, a method for automatically creating managed resources is provided. The method comprises: (1) reading a definition file having a defined syntax for describing objects; (2) reading an object file containing a description of a desired managed object; (3) validating the description in the object file based on the defined syntax in the definition file; and (4) creating a new managed resource based on the validated description.

According to a second aspect of the present invention, a method for automatically creating managed resources is provided. The method comprises: (1) starting a virtual machine; (2) automatically reading a definition file having a defined syntax for describing objects; (3) automatically reading an object file containing a description of a desired managed object, wherein the description defines attributes of the desired managed object; (4) automatically validating the description in the object file based on the defined syntax in the definition file; (5) automatically creating a new managed resource based on the validated description; and (6) creating the desired managed object based on the new managed resource, wherein the created desired managed object has the attributes defined in the description.

According to a third aspect of the present invention, a system for automatically creating managed resources is provided. The system comprises: (1) a definition file system for automatically reading a definition file having a defined syntax for object descriptions after a process is started; (2) an object file system for automatically reading an object file containing a description of a desired managed object after the process is started; (3) a validation system for automatically validating the description in the object file using the defined syntax in the definition file after the definition file and the object file are read; and (4) a resource system for automatically creating a new managed resource based on the validated description.

According to a fourth aspect of the present invention, a program product stored on a recordable medium for automatically creating managed resources is provided. When executed, the program product comprises: (1) program code for automatically reading a definition file having a defined syntax for object descriptions after a process is started; (2) program code for automatically reading an object file containing a description of a desired managed object after the process is started; (3) program code for automatically validating the description in the object file using the defined syntax in the definition file after the definition file and the object file are read; and (4) program code for automatically creating a new managed resource based on the validated description.

Therefore, the present invention provides a method, system and program product for automatically creating managed resources.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram, according to the print invention.

Figure 1:
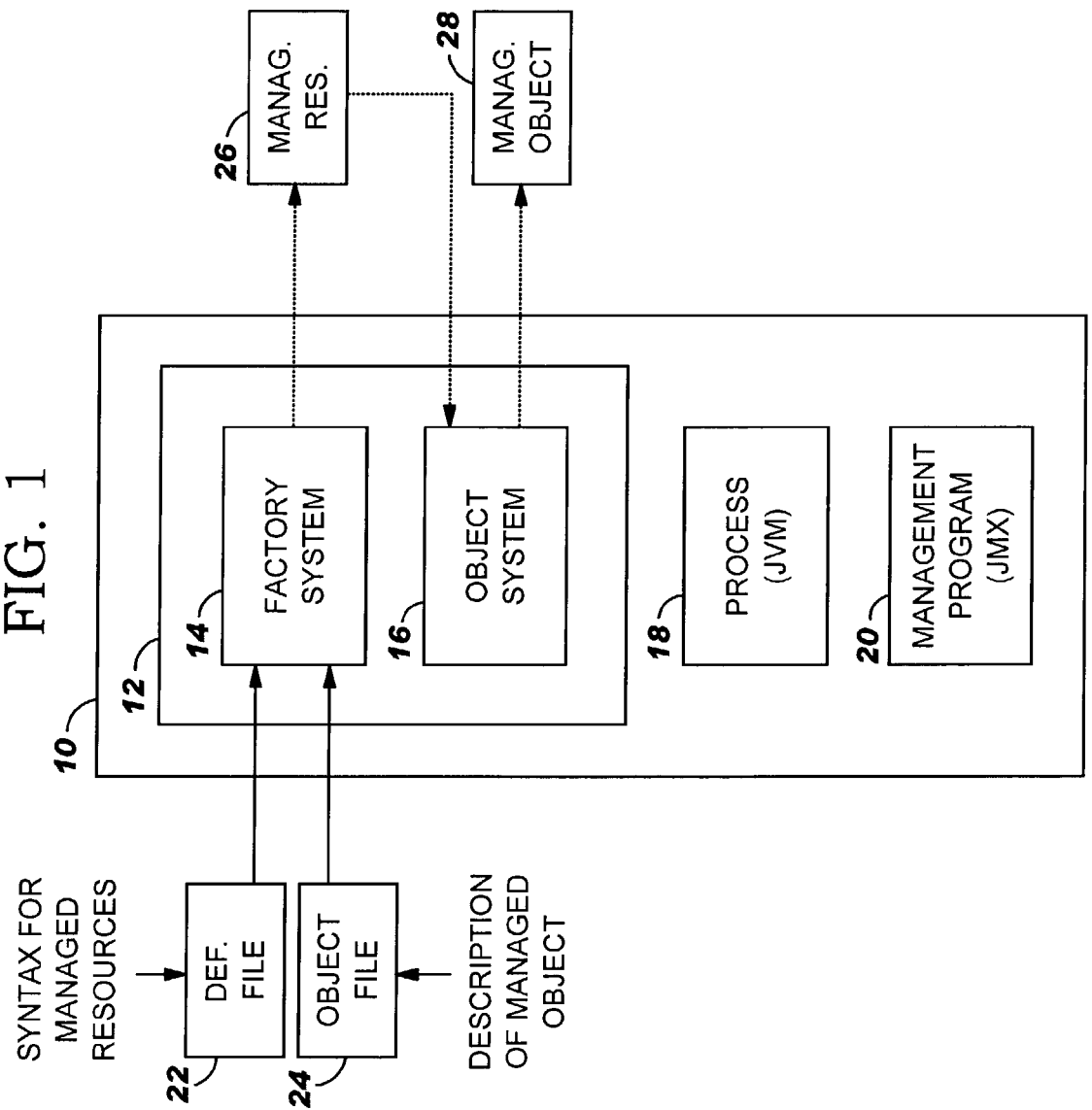
FIG. 1 depicts system for automatically creating managed resources, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for automatically creating managed resources. Specifically, under the present invention, when a process such as a JAVA virtual machine is started, a definition file and an object file are automatically read. The definition file defines a syntax for describing object description, and the object file contains a description of a desired managed object. Based on the object description syntax in the definition file, the description of the desired managed object is automatically validated. If the description is valid, a managed resource such as a JAVA class is automatically created based thereon. Once the JAVA class is created, managed objects based thereon can be created. Since the JAVA class was created based in the description set forth in the object file, the managed objects created based on the JAVA class will have the attributes set forth in the description. Thus, the present invention allows a managed resource to be created simply by providing a description of the desired resource.

Referring now to FIG. 1, computer system 10 having a factory system 14 for automatically creating managed resources is shown. Under the present invention, a JAVA class managed resource 26 is automatically created based upon document type definition file (hereinafter "definition file") 22 and object type descriptor file (hereinafter "object file") 24. Definition file 22 includes a defined syntax for describing objects (e.g., JAVA objects). That is, definition file 22 includes all of the verbiage (e.g., verbs, nouns, etc.) used for describing the functions and attributes of all managed objects. To this extent, definition file 22 can be thought of as a "global" description file from which descriptions of all individual managed objects should be drawn. Typically, the syntax within definition file 22 is in Extended Markup Language (XML). Object file 24 is typically an XML file that contains a description of a particular, desired managed object. Specifically, the description sets for the desired attributes for the managed object that is to be created. Thus, if a developer wishes a particular managed object to be created, the developer would simply provide an object file that describes the attributes of that managed object. The description in the object file should use verbiage set forth in definition file 22.

In a typical embodiment, factory system 14 is contained within web program 12 (e.g., WEBSPHERE), although this need not be the case. As will be further described below, object system 16 (also shown within web program 12) can be any known system for creating managed objects based on classes. Also shown in FIG. 1 is process (e.g., JAVA Virtual Machine) 18 and management program (e.g., JMX) 20. Under the present invention, if a developer/user desires that a particular managed object 28 be created, the developer will provide object file 24 describing the desired attributes of the managed object 28. Once object file 24 is provided, process 18 is started (or re-started). After process 18 has been started, factory system 14 will automatically read definition file 22 and object file 24. To this extent, it should be understood that definition file 22 and object file 24 could be provided from any source(s) according to any known means. For example definition file 22 and/or object file 24 could be stored locally on computer system 10. Conversely, definition file 22 and/or object file 24 could be provided to computer system 10 over, for example, a network or other distributed environment. In any event, upon reading files 22 and 24, factory system 14 will validate the description within object file 24 against the object description syntax set forth in definition file 22. The validation process is to ensure that the description within object file 24 is in the appropriate format. Specifically, the verbiage used in the description within object file 24 should have been taken from definition file 24. If the description is not valid, the process will stop and no managed resource 26 or object 28 would be created. If, however, the description in object file 24 is valid, factory system 14 would then automatically create a JAVA class managed resource 26 based thereon. As indicated above, a class is the template or blueprint from which objects are drawn. Thus, once JAVA class managed resource 26 has been automatically created, object system 16 could utilize the same to create the desired managed object 28. This resulting managed object 28 would have the attributes set forth in the description within object file 24.

Management program 20 is shown in FIG. 1 to illustrate that once created, resources (objects and classes) can be managed by a separate program. Typically, management of a resource involves the generation and implementation of a management request, which is facilitated by management program 20. It should be understood, however, that the presence of management program 20 within computer system 10 is not necessary for the teachings of the present invention to be carried out.

Figure 2:
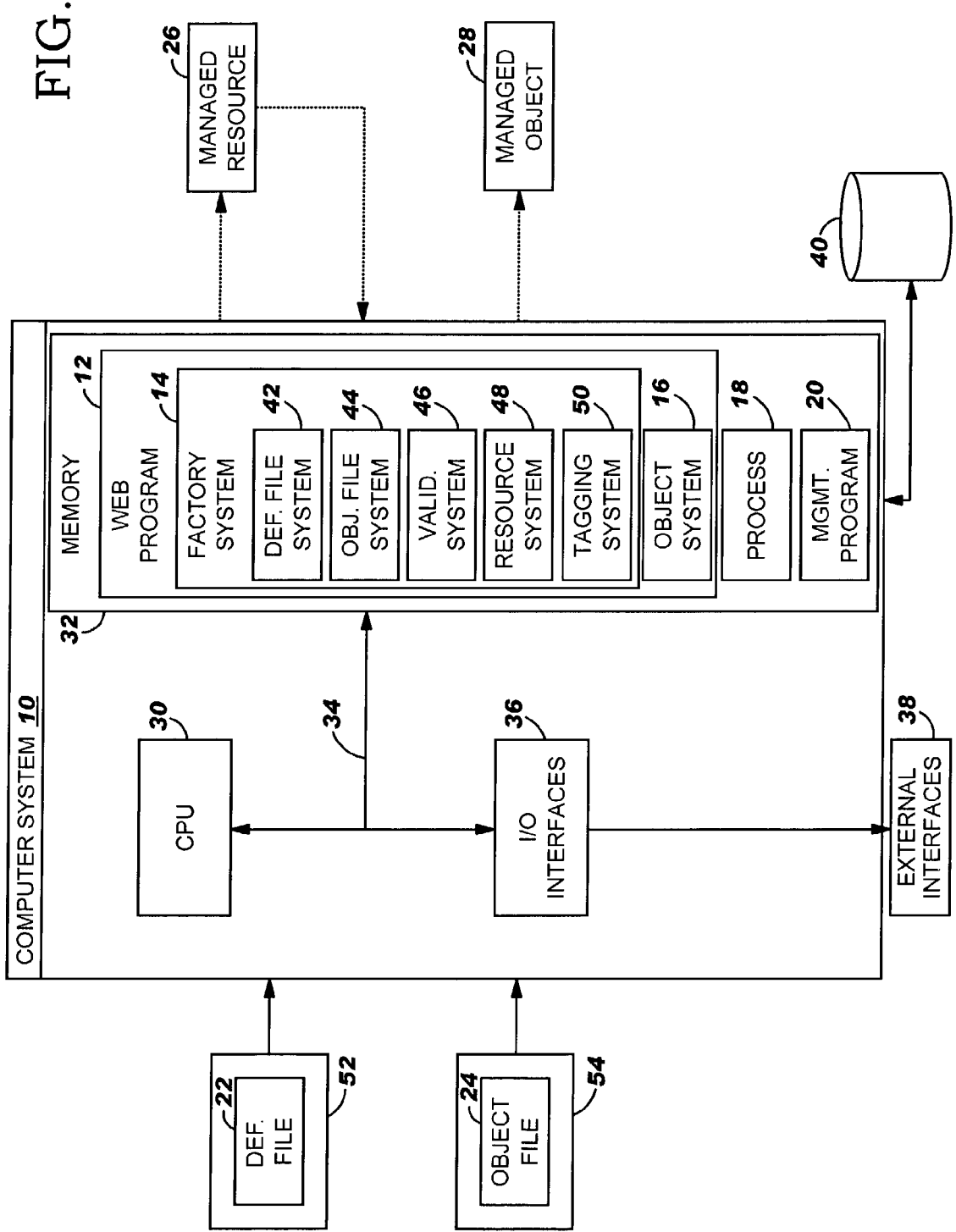
FIG. 2 a more detailed diagram of the system of FIG. 1.

Referring now to FIG. 2, a more detailed depiction of computer system 10 is shown. As shown, computer system 10 generally includes central processing unit (CPU) 30, memory 32, bus 34, input/output (I/O) interfaces 36 and external devices/resources 38. CPU 30 may comprise a single processing unit, or be distributed across one or more processing units in one or more locations, e.g., on a client and server. Memory 32 may comprise any known type of data storage and/or transmission media, including magnetic media, optical media, random access memory (RAM), read-only memory (ROM), a data cache, a data object, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LED screen, hand-held device, keyboard, mouse, voice recognition system, speech output system, printer, monitor, facsimile, pager, etc. Bus 34 provides a communication link between each of the components in computer system 10 and likewise may comprise any known type of transmission link, including electrical, optical, wireless, etc. In addition, although not shown, additional components, such as cache memory, communication systems, system software, etc., may be incorporated into computer system 10.

Database 40 is optional and could provide storage for information under the present invention. Such information could include, for example, descriptor files, object files, classes, objects, etc. As such, database 40 may include one or more storage devices, such as a magnetic disk drive or an optical disk drive. In another embodiment, database 40 includes data distributed across, for example, a local area network (LAN), wide area network (WAN) or a storage area network (SAN) (not shown). Database 40 may also be configured in such a way that one of ordinary skill in the art may interpret it to include one or more storage devices.

As indicated above, files 22 and 24 could be provided from any known sources 52 and 54 according to any known means. Accordingly, it should be understood that communication between sources 52 and 54 and computer system 10 can occur via a direct hardwired connection (e.g., serial port), or via an addressable connection in a client-server (or server-server) environment. In the case of the latter, the server and client may be connected via the Internet, a wide area network (WAN), a local area network (LAN), a virtual private network (VPN) or other private network. The server and client may utilize conventional network connectivity, such as Token Ring, Ethernet, or other conventional communications standards. Where the client communicates with the server via the Internet, connectivity could be provided by conventional TCP/IP sockets-based protocol. In this instance, the client would utilize an Internet service provider to establish connectivity to the server.

Shown in memory 32 of computer system 10 are web program 12, process 18 and management program 20. Web program 12 generally includes factory system 14 and object system 16. As depicted, factory system 14 includes definition file system 42, object file system 44, validation system 46, resource system 48 and tagging system 50. It should be understood that the depictions shown and described herein are for illustrative purposes only and many variations exist. For example, definition file system 42 and object file system 44 could be provided as one system. Moreover, factory system 14 need not be provided within web program 12. Rather, factory system 14 could be provided in any environment in which the automatic creation of managed resources is desired. Still yet, other known systems (e.g., components of web program 12) could be provided.

As indicated above, if a new managed object 28 is desired, a developer/user need only create and provide object file 24 corresponding thereto, and then start (or re-start) process 18. Upon re-start, definition file system 42 will automatically read definition file 22, and object file system 44 will automatically read object file 24. Although definition file 22 and object file 24 are shown as being read from outside sources 52 and 54, it should be appreciated that files 22 and/or 24 could have been read from a local source such as database 40. In any event, once files 22 and 24 are read, validation system 46 will automatically attempt to validate the description within object file 24 based on the object description syntax within definition file 22. If the description is valid, resource system 48 will automatically create JAVA class managed resource 26.

Once managed resource 26 has been created, tagging system 50 could optionally tag the same with an address tag that corresponds to process 18. Specifically, since factory system 14 could be implemented on numerous computer systems (e.g., in a distributed environment), each of which could have one or more processes, it is advantageous to tag each JAVA class managed resource 26 (and subsequent managed object 28) with an address tag that specifically identifies process 18 (e.g., process "A") in which they were created. Thus, when managed object 28 is created based on JAVA class managed resource 26, the object header that corresponds to managed object 26 could also include the address tag. Regardless of where managed object 26 is later utilized, process 18 where it was originally created is readily identifiable.

Referring now to FIG. 3 a method 100 flow diagram according to the present invention is shown. As depicted, first step 102 in method 100 is to start a process. Once started, second step 104 is to read a definition file having a defined syntax for object descriptions. Third step 106 is to read an object file having a description of a desired managed object. Once both files have been read (in any order), fourth step 108 is to validate the description in the object file based on the object description syntax in the definition file. If valid, fifth step 110 is to create a managed resource based on the validated description. Once the managed resource has been created, a managed object can be created based thereon. The managed object will have the attributes set forth in the description. As indicated above, if the managed resource and object could be tagged with an address tag corresponding to the process.

It is understood that the programs and systems of the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computer system 10 such that they carry out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for automatically creating managed resources, comprising:

reading, by a computer device, a definition file that is a global set of definitions for all managed resources that can be created, each definition of the global set of definitions having a defined syntax for describing functions and attributes for an individual managed object;

reading, by the computer device, an object file that contains a description of a single desired managed object;

validating, by the computer device, the description in the read object file based on a defined syntax of a definition in the definition file corresponding to the single desired managed object, wherein the validating ensures that the description within the object file is in the appropriate format as that in the definition file;

creating a new managed resource by a process of the computer device, wherein the created new managed resource is based on the validated description immediately following the validating, wherein the new managed resource is designed to be managed by a separate program, the separate program automatically facilitating any generation and implementation of a management request; and tagging, by the computer device, the new managed resource with an address tag corresponding to the process, wherein the address tag specifically identifies the process and, wherein object header of the single desired managed object created by the new managed resource includes the address tag.

2. The method of claim 1, wherein the defined syntax in the definition file is in XML.

3. The method of claim 1, wherein the object file is an XML file.

4. The method of claim 1, wherein the description contains attributes of the single desired managed object 5. The method of claim 1, wherein the new managed resource is a JAVA class.

6. The method of claim 1, further comprising generating the single desired managed object based on the new managed resource.

7. The method of claim 1, wherein the process is a JAVA virtual machine.

8. The method of claim 1, further comprising starting a process prior to the step of reading the definition file, wherein the definition file and the object file are read, the description in the object file is validated, and the new managed resource is created automatically when the process is started.

9. A system for automatically creating managed resources, comprising:
   a computer, including:
   a definition file system for automatically reading a definition file that is a global set of definitions for all managed resources that can be created, each definition of the global set of definitions having a defined syntax for describing functions and attributes for an individual managed object after a process is started;
   an object file system for automatically reading an object file that is a description of a single desired managed object after the process is started;
   a validation system for automatically validating the description in the object file using a defined syntax of a definition in the definition file corresponding to the single desired managed object after the definition file and the object file are read, wherein the validating ensures that the description within the object file is in the appropriate format as that in the definition file;
   a resource system for automatically creating a new managed resource by the process, wherein the created new managed resource is based on the validated description immediately following the validating, wherein the new managed resource is designed to be managed by a separate program, the separate program automatically facilitating any generation and implementation of a management request; and
   a tagging system for automatically tagging the new managed resource with an address tag corresponding to the process, wherein the address tag specifically identifies the process and, wherein object header of the single desired managed object created by the new managed resource includes the address tag.

10. The system of claim 9, wherein the description defines attributes of the desired managed object.

11. The system of claim 10, further comprising an object system for creating the single desired managed object based on the new managed resource, wherein the created desired managed object has the attributes defined in the description.

12. The system of claim 9, wherein the new managed resource is a JAVA class.

13. The system of claim 9, wherein the object file is an XML file, and wherein the defined syntax in the definition file is in XML.

14. A program product comprising program codes stored on a storage medium for automatically creating managed resources, which when executed by a computer device, the program product performs the steps comprises:
   automatically reading a definition file that is a global set of definitions for all managed resources that can be created, each definition of the global set of definitions having a defined syntax for describing functions and attributes for an individual managed object after a process is started;
   automatically reading an object file that is a description of a single desired managed object after the process is started;
   automatically validating the description in the object file using a defined syntax of a definition in the definition file corresponding to the single desired managed object after the definition file and the object file are read, wherein the validating ensures that the description within the object file is in the appropriate format as that in the definition file;
   automatically creating a new managed resource by the process, wherein the created new managed resource is based on the validated description immediately following the validating, wherein the new managed resource is designed to be managed by a separate program, the separate program automatically facilitating any generation and implementation of a management request; and
   automatically tagging the new managed resource with an address tag corresponding to the process, wherein the address tag specifically identifies the process and, wherein object header of the single desired managed object created by the new managed resource includes the address tag.

15. The program product of claim 14, wherein the description defines attributes of the single desired managed object.

16. The program product of claim 15, further comprising program code performs: creating the single desired managed object based on the new managed resource, wherein the created desired managed object has the attributes defined in the description.

17. The program product of claim 14, wherein the new managed resource is a JAVA class.

18. The program product of claim 14, wherein the object file is an XML file, and wherein the defined syntax in the definition file is in XML.

* * * * *